United States Patent [19]

Sato et al.

[11] 4,410,256

[45] Oct. 18, 1983

[54] ELECTRIC SHUTTER DEVICE HAVING A RECIPROCATING SHUTTER CHARGING MEMBER

[75] Inventors: Akihiko Sato, Kawasaki; Yoshiyuki Nakano, Tokyo, both of Japan

[73] Assignee: Nippon Kogaku K.K., Tokyo, Japan

[21] Appl. No.: 364,798

[22] Filed: Apr. 2, 1982

[30] Foreign Application Priority Data

Apr. 10, 1981 [JP] Japan .................................. 56/53137

[51] Int. Cl.³ .............................................. G03B 9/08
[52] U.S. Cl. .................................... 354/234; 354/173
[58] Field of Search ............... 354/173, 234, 235, 241, 354/245, 246, 266, 267

[56] References Cited

U.S. PATENT DOCUMENTS

| | | | |
|---|---|---|---|
| 4,106,040 | 8/1978 | Ito et al. ............................... | 354/234 |
| 4,153,360 | 5/1979 | Kodaira et al. ...................... | 354/241 |
| 4,199,243 | 4/1980 | Nakano ................................ | 354/173 |
| 4,294,527 | 10/1981 | Hashimoto et al. ................ | 354/173 |
| 4,326,786 | 4/1982 | Uchiyama et al. .................. | 354/234 |
| 4,339,189 | 7/1982 | Nakano ................................ | 354/234 |

*Primary Examiner*—Alan Mathews
*Attorney, Agent, or Firm*—Shapiro and Shapiro

[57] ABSTRACT

In order to utilize the advantage of compactness of the current-attraction type solenoid devices and the advantage of two-solenoid electric shutter of being easily linked with other mechanisms, the electric shutter has such a structure that a reciprocating shutter charging member is not returned at the completion of the shutter charging operation but returned when the first and second solenoids are energized after the picture-taking operation is initiated, and that a resetting member is retract from the moving area of the moving members of the first and second solenoids in relation to said returning motion.

5 Claims, 3 Drawing Figures

ELECTRIC SHUTTER DEVICE HAVING A RECIPROCATING SHUTTER CHARGING MEMBER

BACKGROUND OF THE INVENTION

1. Field of the Invention

The present invention relates to an electric shutter adapted for use in a photographic camera and having a pair of solenoid devices for controlling the function of a shutter opening member and a shutter closing member.

2. Description of the Prior Art

Solenoid devices have beem employed in the exposure time control in the shutter since they facilitate the control of long exposure and enable automatic exposure control of a wide range in combination with a light-measuring circuit.

There are already known solenoids of various types such as a moving coil type in which a movable coil is moved by current supply with respect to a fixed permanent magnet; a current-release type in which an armature attracted by a permanent magnet-coil combination but biased to move away from said magnet is released from said magnet when said coil is powered to temporarily reduce the magnetic power of said magnet; a moving magnet type in which a movable permanent magnet is moved when a fixed coil is powered; and a current-attraction type in which a movable armature biased to move away from a solenoid is attracted thereto or released therefrom upon power supply thereto or termination of power supply.

Among these types, the solenoid device of moving coil type or moving magnet type can be used for the exposure time control by providing the moving member with a self-returning structure and so constructing said member to hold a shutter closing member when the selenoid device is not powered. In such case no particular means is required for resetting the moving member to the holding state after the shutter closing member is released.

However, such solenoid device requires a large electric power for rapidly releasing the holding state and becomes inevitably large in size.

Also the solenoid device of current-release type, having a permanent magnet and a solenoid in combination, is complicated in structure and the coil tends to become large since it has to cancel the magnetic power of the permanent magnet. Also a resetting function is needed in order to return the moving member from a position for releasing the shutter closing member to the holding position. On the other hand, the solenoid device of current-attraction type, though requiring a resetting function, is capable of attracting the armature with a low current, since the energization of the coil can be initiated in a state in which the armature is maintained in contact with a yoke.

For a given current consumption, therefore, the solenoid device of current-attraction type is evidently most suitable for size reduction.

In order to use such solenoid device for controlling the shutter opening or closing member, the solenoid device is so constructed that the moving member prior to movement holds the shutter opening member or shutter closing member but releases said opening or closing member upon movement of the moving member, thereby initiating the shutter opening or closing operation.

Also there is known an electric shutter having two solenoid devices respectively for controlling the function of the shutter opening member and the shutter closing member. For the purpose of clarity, such electric shutter shall be hereinafter called two-solenoid type electric shutter. The use of current-attraction solenoids is desirable for compactizing such two-solenoid type electric shutter. In such case, however, there will be required a pair of resetting devices for the resetting operation, and there will also arise a problem of mechanical linkage of the shutter mechanism, including the resetting devices, with other mechanisms.

SUMMARY OF THE INVENTION

The object of the present invention is to provide a two-solenoid type electric shutter in which the number of linking members with other mechanisms is minimized.

In order to utilize the advantage of compactness of the current-attraction type solenoid devices and the advantage of two-solenoid electric shutter of being easily linked with other mechanisms, the electric shutter of the present invention is featured by a fact that a reciprocating shutter charging member is not returned at the completion of the shutter charging operation but returned when the first and second solenoids are energized after the picture-taking operation is initiated, and that a resetting member is retract from the moving area of the moving members of the first and second solenoids in relation to said returning motion. It is therefore rendered possible to link the shutter mechanism with other mechanism only through a system for transmitting the shutter charging power, and to reduce the precision of the shutter assembling. Also the simpler and compacter shutter mechanism of the present invention allows to realize a compact camera with a reduced production cost.

The aforementioned object can be achieved according to the present invention by a two-solenoid type electric shutter comprising a leading shutter member to be displaced from an aperture closing position to an aperture opening position in response to the shutter releasing operation; a trailing shutter member to be displaced from an aperture opening position to an aperture closing position after a determined time from the start of displacement of said leading shutter member; a biasing member for biasing said leading and trailing shutter members toward the displacing directions thereof; a first movable holding member for holding said leading shutter member at said aperture closing position; a first current-attraction solenoid for attracting said first movable holding member at said holding position; a second movable holding member for holding said trailing shutter member at said aperture opening position; a second current-attraction solenoid for attracting said second movable holding member at said holding position; a reciprocating member for accumulating the biasing force of said biasing member in the forward movement and adapted for performing the reversing movement in response to the shutter releasing operation; a resetting member cooperating with said reciprocating member and adapted to bring said first and second movable holding members to the holding positions thereof in response to the forward movement of said reciprocating member and to be retracted from the moving areas of said first and second movable holding members in response to the backward movement of said reciprocating member; and a current control circuit for energizing said first and second current-attraction solenoids during a period from the shutter releasing operation to the substantial retraction of the resetting member and prior to the start of movement of the leading and trailing shutter members.

DESCRIPTION OF THE PREFERRED EMBODIMENTS

Figure 1:
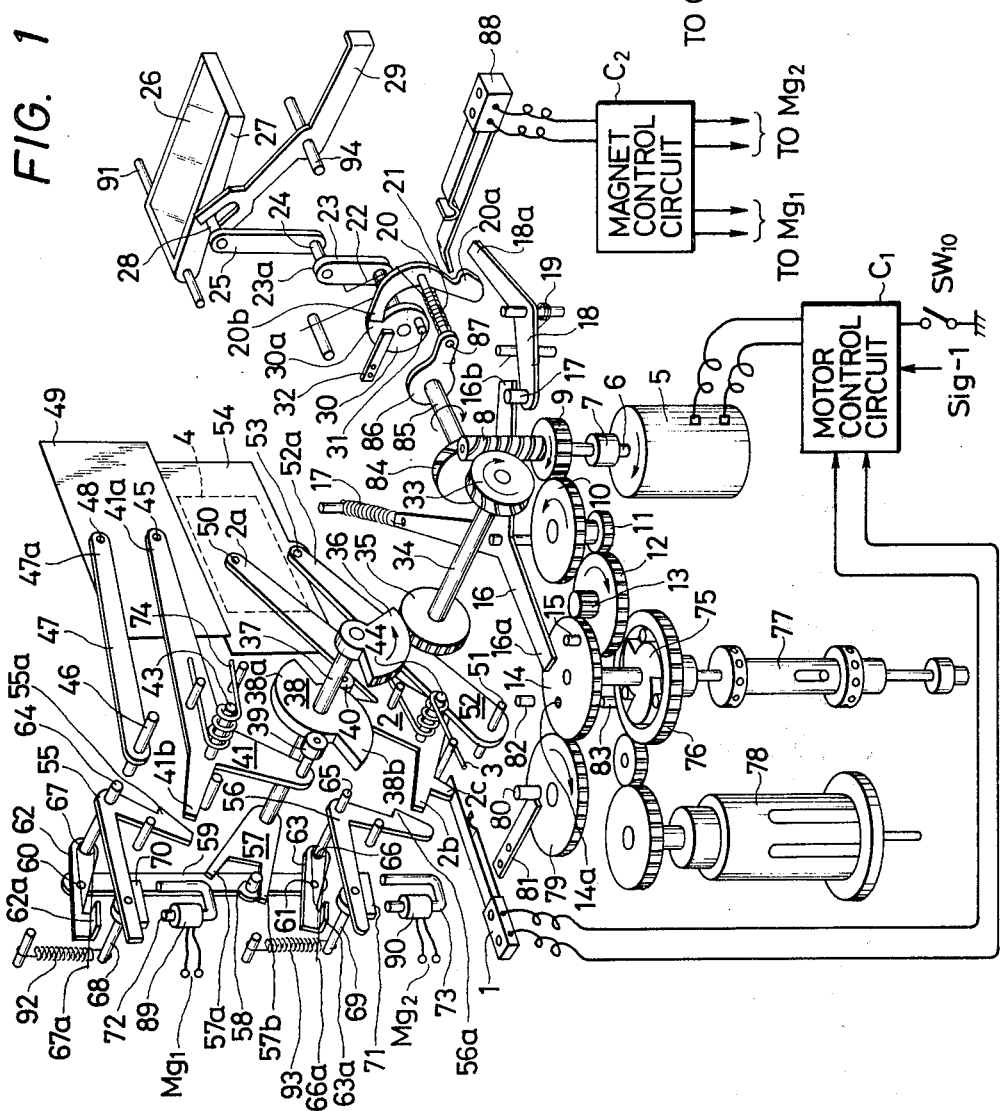
FIG. 1 is a perspective view of a first embodiment of the present invention.

FIG. 1 shows a first embodiment of the present invention applied to a motor-powered single-lens reflex camera.

Said camera functions in the following sequential steps of: shutter releasing operation; mirror lifting and closing of diaphragm from a full-open lens aperture to a predetermined lens aperture; start of the leading shutter member; start of the trailing shutter member; mirror descent and returning of the diaphragm from the predetermined lens aperture to the full-open lens aperture; and shutter charging and film advancing.

These sequential steps will be explained in the following, starting from a timing immediately before the completion of displacement of the trailing shutter member, since the present invention is closely related to the shutter charging.

The exposing operation is completed when an aperture 4 is closed by an upward displacement to the illustrated position of a trailing shutter member or blade 54 caused by counterclockwise rotation of arms 2, 52, whereby a switch 1 is closed by a projection 2c provided on the trailing shutter blade arm 2. Thus a motor control circuit C1 supplies a motor 5 with a DC current to clockwise rotate a shaft 6, whereby a worm gear 8 and a pinion 9 are rotated clockwise through a known slip mechanism 7.

The pinion 9 constantly engages with a gear train 10-14 to anticlockwise rotate the gear 14, whereby a pin 15 provided thereon impinges with an arm 16a of a lever 16 after a certain time from the start of rotation of said gear 14, thereby clockwise rotating said lever 16 against the action of a spring 17.

The other arm 16b of said lever 16 thus anticlockwise rotate a lever 18 through a pin integral therewith against the action of a spring 19. Consequently, the other end 18a of said lever 18 pushes a projection 20a of a finger 20 to cause clockwise rotation thereof against the action of a spring 21.

Said clockwise rotation releases the other end 20b of said lever 20 from a shoulder portion 30a of a cam 30, whereby said cam 30 initiates clockwise rotation by the biasing force of a spring 22.

Said rotation is transmitted through a crank 23, a crank pin 24 and a rod 25 to a mirror 26, which therefore initiates to descend by clockwise rotation from the illustrated lifted position.

Simultaneously a pin 28 provided on a mirror supporting frame 27 rotates a diaphragm lever 29 anticlockwise to return the unrepresented lens diaphragm from the predetermined lens aperture to the full-open aperture.

The clockwise rotation of the crank 23 and the integral cam 30 is terminated upon impingement of a pin 31 thereof with a stopper 32, and at this point the mirror 26 reaches the descended position and the lens diaphragm reaches the full-open aperture.

Simultaneously the end 23a of the crank 23 turns off a magnet control switch 88, whereby a magnet control circuit C2 interrupts the current supply to coils 89, 90 of solenoids Mg1, Mg2 until said switch is again closed.

A worm gear 33 engaging with the worm 8 is rotated clockwise to rotate an integral shaft 34 and a gear 35 in the same direction, whereby a sector gear 36 constantly engaging with said gear 35, a shaft 37 and a cam 38 are rotated anticlockwise.

The cam 38 is provided with two cam faces 38a, 38b, which respectively impinge with a roller 39 provided on a leading shutter blade 41 and a roller 40 provided on the trailing shutter blade arm 2. Consequently, said arms 41, 2 rotate clockwise respectively about shafts 43, 44 according to the displacements of said rollers 39, 40.

A leading shutter blade 49 is articulated to the end 41a of said arm 41 through a pin 45 and also through a pin 48 to the end 47a of an auxiliary arm 47 supported by a shaft 46. In this manner, the arms 41, 47 and the shafts 43, 46, 45, 48 constitute a parallelogram link mechanism which causes a downward parallel displacement of the leading shutter blade 49 to the aperture closing position. Similarly, a trailing shutter blade 54 is articulated through a pin 50 to the end 2c of the trailing shutter blade arm 2 and also through a pin 53 to the end 52a of an auxiliary arm 52 supported by a shaft 51, whereby said trailing shutter blade 54 is displaced downward to the aperture opening position. In this manner, the aperture 4 which has been covered by the trailing shutter blade 54 becomes covered by the leading shutter blade 49.

The aforementioned leading shutter blade arm 41 continues clockwise rotation until another arm 41b thereof is held by a latch 55a of a leading shutter blade holding lever 55.

Similarly, the trailing shutter blade arm 2 continues clockwise rotation until another arm 2b thereof is held by a latch 56a of a trailing shutter blade holding lever 56. Said rotations accumulate energy in drive springs 74, 3.

Simultaneously with the above-mentioned returning of shutter blades and charging of drive springs, systems relating to the solenoids Mg1, Mg2 are reset.

The shaft 37 is provided at the end thereof with an intermediate lever 57, of which a finger 57a pushes down a lever 59 through a pin 58 in response to the anticlockwise rotation of the sector gear 36. Said lever 59 is articulated, through pins 60, 61 at the upper and lower ends thereof, to first and second resetting levers 62, 63.

Said resetting levers 62, 63 are rotatably supported by shafts 64, 65 which are integral with the leading and trailing shutter blade holding levers 55, 56.

In response to the downward displacement of the lever 59, the first and second resetting levers 62, 63 are rotated anticlockwise. First and second resetting springs 67, 66 are respectively positioned between said first and second resetting levers 62, 63 and bent portions 62a, 63a thereof in such a manner as to exert an initial biasing force in the anticlockwise direction.

In response to the anticlockwise rotation of the first and second resetting levers 62, 63, the ends 62a, 63a thereof press down pins 68, 69 respectively fixed to the leading and trailing shutter blade holding levers 55, 56.

Said pins 68, 69 rotatably support armatures 70, 71.

Thus, in response to the anticlockwise rotation of the levers 55, 56 the armatures 70, 71 are respectively pressed against yokes 72, 73.

Even if the anticlockwise rotation of said levers 55, 56 takes place prior to the clockwise rotation of the arms 41, 2, the presence of springs 67, 66 avoids the destruction of the mechanisms.

Also even if the angle of said anticlockwise rotation is excessively large, the mechanisms are protected by said springs 67, 66.

Through the above-mentioned procedure, the levers 55, 56 assume positions adapted for holding the clockwise biasing force of drive springs 74, 3 exerted through the arms 41, 2.

The shutter charging operation is completed in this manner.

During said operation the film advancing operation is also conducted in relation to the pinion 9 as will be briefly explained in the following.

During said shutter charging operation, the gear 14 is rotated counterclockwise through the pinion 9 and the gear train 10–14. Under the gear 14 there is provided a known one-way clutch 75, which transmits the counterclockwise rotation alone of the gear 14 to a gear 76.

Said rotation of the gear 76 is transmitted to a sprocket 77 and a film spool 78 for advancing the photographic film. The function of such mechanism is already well known in the art and is therefore not explained.

At this point the mirror is in the lowered state as explained in the foregoing. The worm 8, also constantly engaging with another worm gear 84, rotates a shaft 85 integral therewith clockwise to likewise rotate a disk 86 attached to said shaft 85. Said disk 86 has a pin 87 rotatably supporting the aforementioned lever 20, whereby said lever 20 moves around the shaft 85 and the cam 30 clockwise, following the shoulder 30a of the cam 30 already stopped after the descent of the mirror and thereby reestablishing the engagement of the end portion 20b with said shoulder 30a. The abovementioned operation is completed during the operation of shutter charging and film advancement.

The gear 14 also constantly engages with a limiting gear 79 having a pin 80, which impinges with a stopper 81 upon completion of the shutter charging and film advancement to terminate the clockwise rotation of the gear 79, whereby the slip mechanism 7 provided above the motor 5 initiates slipping. However, at this point, a hole 14a in the gear 14 is positioned corresponding to a photocoupler composed of a light source 82 and a sensor 83, so that a photoelectric signal Sig1 generated thereby stops the motor 5 through the motor control circuit C1.

As explained in the foregoing, the steps of shutter charging and film advancement are completed following the steps of mirror descent and diaphragm opening, thereby rendering the shutter mechanism ready for the next picture shooting.

The picture taking operation is conducted in the following manner. In response to the actuation of an unshown shutter release button, a release switch SW10 is closed to provide the motor 5 with an inverse current through the motor control circuit, thereby inversely rotating the shaft 6. Consequently, the worm 8 is inversely rotated to anticlockwise rotate the shoulder 30a of the cam 30 through the worm gear 84, shaft 85, disk 86, pin 87 and end portion 20b of lever 20, thereby causing anticlockwise rotation of the crank 23 integral with said cam 30.

The end 23a of said crank 23 is thus lifted from the lowered position to close the switch 88, whereby the magnet control circuit C2 energizes the coils 89, 90 to attract the armatures 70, 71 toward the yokes 72, 73.

The crank 23 continues anticlockwise rotation to rotate the mirror holding frame 27 anticlockwise about a shaft 91 through a lever crank mechanism composed of the pin 24, rod 25 and pin 28, whereby the mirror 26 is elevated and retracted from the picture-taking light path.

The worm 8 also rotates the worm gear 33 in a direction opposite to the illustrated arrow to clockwise rotate the cam 38 and the lever 57 through the shaft 34, gear 35, sector gear 36 and shaft 37. The clockwise rotation of the cam 38 releases the cam faces 38a, 38b from the impingement with the rollers 39, 40. In this state, the arms 41, 2, biased anticlockwise by the springs 73, 3, are prevented from rotation by the latches 55, 56.

Also in response to the clockwise rotation of the lever 57, the pin 58 is released from the engagement with the finger 57a and is pushed upwards by another finger 57b, whereby the lever 59 moves upwards to cause clockwise rotation of the first and second resetting levers 62, 63 and the first and second resetting springs 67, 66. Consequently, the levers 55, 56 are released from the anticlockwise biasing force of said resetting springs 67, 66 and become biased clockwise by release springs 92, 93. However, said levers retain the positions thereof since the armatures 70, 71 are magnetically attracted by the yokes 72, 73.

Also the gear 14 is rotated clockwise by the gear train linked to the pinion 9, but the film advancement is not effected due to the presence of the one-way clutch 75.

In the course of clockwise rotation of said gear 14, a pin 15 provided thereon impinges with the end 16a of the lever 16 to cause anticlockwise rotation thereof, whereby another arm 16b moves in a direction away from the pin 17.

Consequently, the lever 18 is not rotated anticlockwise and maintains the engagement of the lever 20 and the cam 30 intact, whereby the elevating motion of the mirror 26 is not hindered.

In this manner, the shutter charging mechanism returns to a state before the shutter charging, and the mirror performs the upward motion.

Simultaneously with said mirror elevating motion, the lever 94, linked with the pin 28 is rotated clockwise about the shaft 94 to change the unshown lens diaphragm to the predetermined lens aperture. Upon inverse rotation of the limiting gear 79 engaging with the gear 14, the pin 80 impinges with the stopper 81 to stop said gear 79, whereby the slip mechanism 7 linked therewith through the gear train starts slipping.

At this point the hole 14a of the gear 14 is again positioned corresponding to the photocoupler composed of the light source 82 and the sensor 83 to terminate the power supply to the motor 5 through the motor control circuit C1.

Subsequently, at a desired timing determined for example in relation to the rising motion of the mirror, the magnet control circuit C2 is activated to terminate the power supply to the coil 89 and then to the coil 90 with an interval corresponding to the desired exposure time, whereby the levers 55, 56 are clockwise rotated in succession by the biasing force of the release springs 92, 93 to release the arms 41, 2, thus causing the upward displacement of the leading shutter blade 49 and the trailing shutter blade 54 in succession and thereby effecting the exposure through the shutter.

Thereafter effected is the charging step explained in the foregoing.

Figure 2:
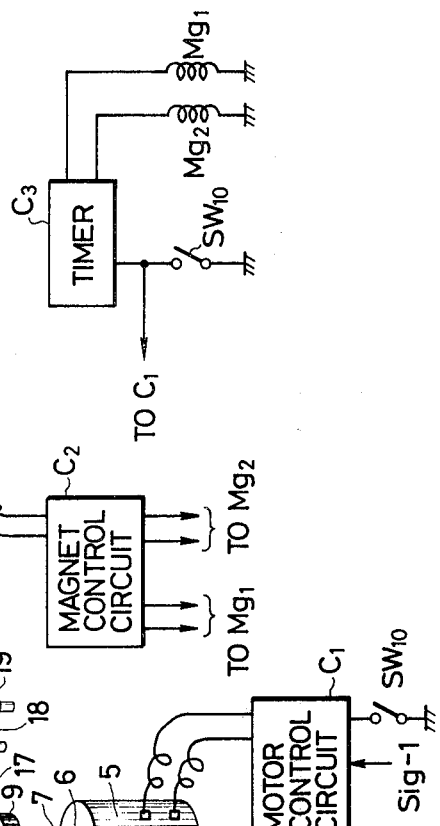
FIG. 2 is a schematic diagram showing a current control circuit in a second embodiment of the present invention.

In the foregoing embodiment, the first and second solenoids 89, 90 can be energized immediately before the levers 55, 56 are released from the anticlockwise biasing force of the first and second resetting springs 67, 66 and become biased clockwise by the release springs 92, 93. For this reason, there may be employed a circuit as shown in FIG. 2 as an alternative embodiment, wherein a timer C3 measures the period from the closing of the switch SW10 to said clockwise biasing and energizes the coils 89, 90 upon expiration of said period. In this manner, it is possible to eliminate the switch 88.

For example, in a motor-driven camera, it is effective to utilize the motor rotation in both directions in order to improve the efficiency and to simplify the mechanisms. As explained in the foregoing, the above-explained embodiments utilize the motor rotations in both directions for the resetting and returning functions of the resetting device without any complicated additional devices, and also the assembling and adjustment of the camera are facilitated since the shutter mechanism is mechanically linked with other mechanisms through gears 35, 36 alone.

Figure 3:
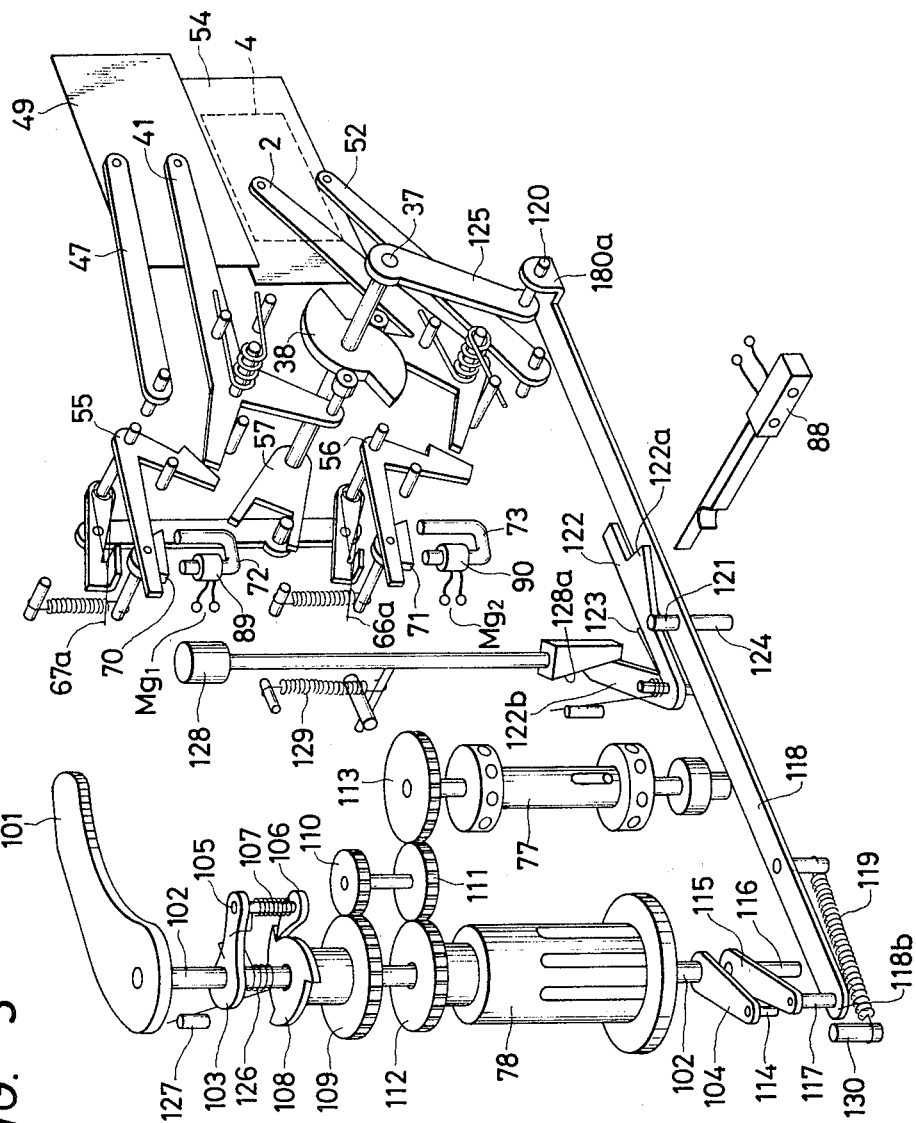
FIG. 3 is a perspective view of a third embodiment of the present invention.

Now there will be given an explanation on a third embodiment of the present invention shown in FIG. 3, which is applied to a camera with manual film advancement. FIG. 3 shows a state after a picture taking but before film advancement.

In response to an anticlockwise rotation of a film advancing lever 101, a shaft 102 and a film advancing arm 103 integral therewith are also rotated anticlockwise. Also a charging lever 104 provided below said shaft 102 is likewise rotated anticlockwise.

Said film advancing arm 103 is provided with a fixed shaft 105 rotatably supporting a film advancing claw 106 which is biased anticlockwise by a spring 107. Thus, upon anticlockwise rotation of the film advancing arm 103, the film advancing claw 106 engages with a shoulder 108a of a ratchet 108 to rotate the same anticlockwise. Said ratchet 108 is integrally constructed with a first gear 109, whereby said rotation is transmitted to a second gear 110, a third gear 111, a spool gear 112 and a sprocket gear 113. Said ratchet 108 and gears 109–113 are supported by said shaft 102. The spool gear 112 and the spool 78 are rendered rotatable to said shaft 102.

Said sprocket gear 113 also engages with a sprocket 77.

Thus the photographic film is advanced by the anticlockwise rotation of the spool 78 and the sprocket 77.

The function of film advancement by the anticlockwise rotation of the film advancing lever 101 is already known in the art and is not therefore explained in further detail.

The charging lever 104 rotates anticlockwise with the shaft 102 to rotate a lever 115, through a pin 114, about a shaft 116.

Said lever 115 is provided with a pin 117 fixed thereto which is rotatably linked with a charging rod 118.

Consequently the charging rod 118 is moved toward right against the biasing force of a spring 119. The other end 118a of said charging rod 118 is coupled rotatably with a pin 120, with certain freedom of movement also in other directions. Said pin 120 is fixed on a lever 125.

Thus, in response to a forward displacement of the charging rod 118, the lever 125 is rotated anticlockwise to rotate a shaft 37 and a cam 38 also anticlockwise. The ensuing charging procedure is identical with that shown in the foregoing first embodiment and is therefore not explained in the following.

In this manner, leading and trailing shutter blades 49, 54 are displaced downwards, arms 41, 2 are held by holding levers 55, 56, and armatures 70, 71 are pressed against yokes 72, 73 to complete the charging process.

Toward the end of the forward displacement of the rod 118, a pin 121 provided on the charging rod 118 pushes away a key member 122, which is therefore rotated anticlockwise against the biasing force of a spring 123. After the passage of said 121, a hook portion 122a of said key member 122 enters the moving trajectory of said pin 121, whereby the pin 121 and the charging rod 118 are prevented from the movement to the left.

Also a pin 124 provided under said charging rod 118 turns off a magnet control switch 88, thereby terminating the power supply to first and second solenoids Mg1, Mg2.

Upon completion of the shutter charging, the film advancing arm 103 impinges with a pin 127 to limit the anticlockwise rotation of the film advancing lever 101.

When the operator releases the film advancing lever 101, the lever 101, shaft 102, film advancing arm 103 and charging lever 104 are rotated clockwise to the original positions by the biasing force of a spring 126.

However, since the charging rod 118 is prevented from the leftward displacement as explained above, the lever 115 is unable to rotate clockwise so that the shutter mechanism is retained in the charged state. The preparation for picture taking is completed in this manner.

The picture taking operation is performed in the following manner. When a shutter release button 128 is pushed down against the biasing force of a return spring 129, a ramp portion 128a formed in the lower part of said shutter release button pushes an arm 122b of the key member 122, causing anticlockwise rotation thereof.

Consequently the pin 121 is released from the hook portion 122a and the charging rod 118 starts to move toward left by the biasing force of the spring 119.

The pin 124 moves simultaneously to the left to immediately close the magnet control switch 88, whereby the coils 89, 90 of the first and second solenoids Mg1, Mg2 are energized to attract armatures 70, 71 to yokes 72, 73.

The above-mentioned returning motion of the charging rod 118 is terminated upon impingement of an end 118b thereof with a stopper 130.

In this state the lever 125, shaft 37, cam 38 and lever 57 are returned to respective positions prior to the shutter charging.

Then, by interrupting the power supply to the coils 89, 90 in succession at desired timings, the holding levers 55, 56 are rotated clockwise in succession to cause displacement of the leading and trailing shutter blades 49, 54 at a determined interval thereby effecting the exposure to the film. The picture-taking operation is completed in this manner.

The above-explained third embodiment is also applicable to a single-lens reflex camera if the mechanism is constructed in such a manner that the mirror and diaphragm mechanisms are activated in response to the pressing of the shutter release button 128 and the pin 121 is released from the key member 122 in the course of said activated movements. Also the magnet control switch 88 can be closed any time during a period from the pressing of the shutter release button 128 to the releasing of the armatures 70, 71 by the end portions 67a, 66a of the first and second resetting springs.

In contrast to the conventional shutter mechanism in which the charging rod 118 is returned in response to the returning of the film advancing lever 101 to a position before the shutter charging, said third embodiment is characterized by a fact that said charging rod 118 is retained in the charged position by a holding member and is returned to the original position after the energization of solenoids but before the start of displacement of shutter blades.

The present invention is not limited to the shutter with vertically running blades as explained in the foregoing but is applicable also to the shutter with horizontally running blades or focal-plane shutter.

We claim:

1. An electric shutter including a leading shutter member adapted to move from an exposing aperture closing position to an exposing aperture opening position in response to a shutter releasing operation; a trailing shutter member adapted to move from said exposing aperture opening position to said exposing aperture closing position after the start of movement of said leading shutter member; biasing means for biasing said leading and trailing shutter members toward the direction of said movement; first holding means having a position for holding said leading shutter member at said exposing aperture closing position; a first solenoid means adapted for attracting said first holding means at said holding position; second holding means having a position for holding said trailing shutter member at said exposing aperture opening position; and a second solenoid means adapted for attracting said second holding means at said holding position in order to enable an exposure of a determined duration by successive de-energization of said first and second solenoid means, wherein said improvement comprises reciprocating means adapted to accumulate the biasing force of said biasing means during the forward displacement and to perform a backward displacement in response to said shutter releasing operation; resetting means adapted to bring said first and second holding means to said holding positions in response to said forward displacement and to enable retraction of said first and second holding means from said holding positions in response to said backward displacement; and current control means adapted to energize said first and second solenoid means during a period from said shutter releasing operation to the enabling of retraction of said first and second holding means and before the start of movement of said leading and trailing shutter members.

2. An electric shutter according to claim 1, wherein said reciprocating means comprises a drive source drivable in first and second directions; a drive source control circuit adapted for driving said drive source in said first direction in response to the completion of said exposure and to drive said drive source in said second direction in response to said shutter releasing operation; and means for accumulating the biasing force of said biasing means in response to the drive in said first direction of said drive source.

3. An electric shutter according to claim 1, wherein said resetting means comprises first and second biasing means adapted to hold said first and second holding means at said holding positions while they are biased toward said holding positions.

4. An electric shutter according to claim 1, wherein said current control means comprises timer means adapted to measure a period from said shutter releasing operation to the enabling of retraction of said first and second holding means and to energize said first and second solenoid means upon expiration of said period.

5. An electric shutter according to claim 1, further comprising film advancing control means and shutter release means, wherein said reciprocating means comprises a movable member which is rendered movable in first and second directions and is adapted to move in said first direction in response to said film advancing control means and to move in said second direction in response to said shutter release means; and means for accumulating the biasing force of said biasing means in response to the movement in said first direction of said movable member.

* * * * *